United States Patent
Rhee et al.

(10) Patent No.: US 11,869,137 B2
(45) Date of Patent: Jan. 9, 2024

(54) METHOD AND APPARATUS FOR VIRTUAL SPACE CONSTRUCTING BASED ON STACKABLE LIGHT FIELD

(71) Applicant: INHA UNIVERSITY RESEARCH AND BUSINESS FOUNDATION, Incheon (KR)

(72) Inventors: Chae Eun Rhee, Seoul (KR); Hyunmin Jung, Seoul (KR); Hyuk-Jae Lee, Gyeonggi-do (KR)

(73) Assignee: INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 0 days.

(21) Appl. No.: 17/048,299

(22) PCT Filed: Aug. 12, 2020

(86) PCT No.: PCT/KR2020/010673
§ 371 (c)(1),
(2) Date: Oct. 16, 2020

(87) PCT Pub. No.: WO2022/010026
PCT Pub. Date: Jan. 13, 2022

(65) Prior Publication Data
US 2023/0121124 A1    Apr. 20, 2023

(30) Foreign Application Priority Data
Jul. 7, 2020    (KR) .................. 10-2020-0083379

(51) Int. Cl.
G06T 15/50    (2011.01)
H04N 13/254    (2018.01)
H04N 13/351    (2018.01)

(52) U.S. Cl.
CPC ......... *G06T 15/503* (2013.01); *H04N 13/254* (2018.05); *H04N 13/351* (2018.05)

(58) Field of Classification Search
CPC ..... G06T 15/503; G06T 15/205; G06T 15/50; G06T 19/00; G06T 19/006;
(Continued)

(56) References Cited

U.S. PATENT DOCUMENTS 6,781,591 B2    8/2004    Raskar
10,244,227 B2    3/2019    Erickson
(Continued)

FOREIGN PATENT DOCUMENTS

JP    2006-502479 A    1/2006
JP    2015198340       11/2015
(Continued)

OTHER PUBLICATIONS

Jung et al., "Flexibly Connectable Light Field System for Free View Exploration", IEEE Transactions on Multimedia, vol. 22, No. 4, Apr. 2020, 12 pages. (Year: 2020).*
(Continued)

*Primary Examiner* — Michael Le
(74) *Attorney, Agent, or Firm* — Ohlandt, Greeley and Perle, LLP

(57) ABSTRACT

The electronic apparatus includes a memory stored with a multiple light field unit (LFU) structure in which a plurality of light fields is arranged in a lattice structure, and a processor configured to, based on a view position within the lattice structure being determined, generate a 360-degree image based on the view position by using the multiple LFU structure, and the processor is configured to select an LFU to which the view position belongs from among the multiple LFU structure, allocate a rendering field-of-view (FOV) in predetermined degrees based on the view position, generate
(Continued)

a plurality of view images based on a plurality of light fields comprising the selected LFU and the allocated FOV, and generate the 360-degree image by incorporating the generated plurality of view images.

17 Claims, 16 Drawing Sheets

(58) Field of Classification Search
CPC .............. G06T 2215/12; H04N 13/254; H04N 13/351; H04N 13/243; H04N 13/32
See application file for complete search history.

(56) References Cited

U.S. PATENT DOCUMENTS

| | | | |
|---|---|---|---|
| 10,250,866 B1* | 4/2019 | Jenny | .................... H04N 13/243 |
| 10,417,810 B2 | 9/2019 | Lodato | |
| 2007/0097206 A1* | 5/2007 | Houvener | ............. H04N 13/368 |
| | | | 348/E13.041 |
| 2011/0164108 A1* | 7/2011 | Bates | ..................... H04N 23/00 |
| | | | 348/36 |
| 2017/0178395 A1 | 6/2017 | Pharr | |
| 2017/0365068 A1* | 12/2017 | Tan | ...................... H04N 13/271 |
| 2018/0192081 A1* | 7/2018 | Huang | ................... A63F 13/355 |
| 2019/0158815 A1* | 5/2019 | He | ................. H04N 21/234327 |
| 2020/0014904 A1* | 1/2020 | Wetzstein | .............. H04N 13/15 |

FOREIGN PATENT DOCUMENTS

| | | |
|---|---|---|
| KR | 20180019695 | 2/2018 |
| KR | 20190021229 | 3/2019 |
| KR | 10-2055410 B1 | 12/2019 |
| KR | 102054716 | 12/2019 |
| KR | 20200012875 | 2/2020 |
| KR | 20200021891 | 3/2020 |

OTHER PUBLICATIONS

International Search Report dated Apr. 1, 2021 for corresponding International Patent Application No. PCT/KR2020/010673 with English translation, 9 pages.

Written Opinion of the International Searching Authority dated Apr. 1, 2021 for corresponding International Patent Application No. PCT/KR2020/010673 with English translation, 7 pages.

Jung, "Flexibly Connectable Light Field System for Free View Exploration", IEEE Transactions on Multimedia, vol. 22, No. 4, Apr. 2020, 12 pages.

Korean Office Action (with English translation) dated Aug. 17, 2023 or Korean Appl. No. 10-2020-7031054.

* cited by examiner

METHOD AND APPARATUS FOR VIRTUAL SPACE CONSTRUCTING BASED ON STACKABLE LIGHT FIELD

TECHNICAL FIELD

The disclosure relates to a method and apparatus for constructing a virtual space based on stackable light field. More particularly, the disclosure relates to a method and apparatus for constructing a virtual space based on stackable light field which may provide a flexible connection method with respect to a multiple LF system.

BACKGROUND ART

Various interactive multimedia technology has received attention for creating a variety of experiences that go beyond simple video viewing. The 360° panoramic image popularly used in virtual reality (VR) is applied to various applications such as games, a specific tourist application, or the like as one of the success cases of an interactive multimedia system. Unlike existing images, an option to choose a view direction is provided to the user.

However, in order to promote a wide range of options and to enhance quality of experience in an interactive VR video, many technical bottlenecks and technical problems must be overcome. One from among the main technical problems is supporting a wide view change.

Unlike the conventional 2-dimensional (2D) or stereoscopic multimedia system, a new framework for obtaining and processing is required for a free view navigation. The view which is generated from an arbitrary viewpoint should be easy and effective within the limited acquisition equipment and data function. The wide search of VR images allows for a more immersive experience.

Research efforts focusing to raise degrees of freedom (DoF) of captured image-based VR application comprising a 6-DoF standardized plan of moving picture experts group (MPEG) has been underway.

The 6-DoF represents a DoF of changing a viewpoint of x-axis, y-axis, z-axis, which is combined with a rotating change in the field of view along the three axes. The most intuitive method of extending DoF in a captured image-based VR system is representing a real space in the graphics. The 6-DoF may be implemented similarly to a computer graphic application through a 3D modeling of a captured image. However, this requires a high degree of computational complexity, and has the disadvantage of increasing the likelihood of errors such as holes occurring according to the characteristics of the image or the captured environment.

DISCLOSURE

Technical Problem

The disclosure provides a flexible connection method with respect to a multiple LF system by using the constant radiance of rays in LF theory. The flexibly connectable LF system extends the range of view position which is renderable under reasonable conditions of the camera, and provides a method and apparatus for extending the range of view position which is renderable under reasonable conditions of the camera FOV.

Technical Solution

In an aspect, a method of constructing a virtual space based on a stackable light field may include selecting one multiple light field unit (LFU) from a multiple LFU structure, allocating rendering field-of-view (FOV) for a plurality of light fields (LF) with respect to the selected on LFU, independently rendering a view with respect to each LF, and incorporating by projecting the rendered view and blending.

The independently rendering a view with respect to each LF connects a plurality of LFs by selecting a portion of shared light from a plurality of points of the linear plane, using the constant radiance of rays for connecting a multiple linear plane, and selecting a point within a connectable range that is not a physical cross point of the linear plane.

The independently rendering a view with respect to each LF extends the length of the linear plane to four directions, connects the linear LF obtained from the extended plane by selecting a portion of the shared light from a plurality of points of the linear plane, and the extended length of the linear plane is extended to a maximum of the basic length of a linear plane prior to being extended to reduce distortion of a captured image by reducing the required input FOV.

The multiple LFU structure may construct a virtual space of a plurality of forms, including a circular and atypical structure regardless of shape and size through stacking the plurality of LFUs having a quadrangular camera structure.

In another aspect, the light field based virtual space construction apparatus suggested in the disclosure may include an LFU selector selecting one LFU from a multiple light field unit (LFU) structure, an allocator allocating a rendering field-of-view (FOV) for a plurality of light fields (LF) of a selected one LFU, a render independently rendering a view with respect to each LF, and a virtual space generator which incorporates by projecting a rendered view and blends.

The electronic apparatus according to an embodiment of the disclosure may include a memory stored with a multiple light field unit (LFU) structure in which a plurality of light fields is arranged in a lattice structure, and a processor configured to, based on a view position within the lattice structure being determined, generate a 360-degree image based on the view position by using the multiple LFU structure, and the processor is configured to select an LFU to which the view position belongs from among the multiple LFU structure, allocate a rendering field-of-view (FOV) in predetermined degrees based on the view position, generate a plurality of view images based on a plurality of light fields comprising the selected LFU and the allocated FOV, and generate the 360-degree image by incorporating the generated plurality of view images.

The multiple LFU comprises the plurality of light fields arranged in the lattice structure, a shell of the lattice structure is a circular or an atypical structure.

The plurality of light fields may include a plurality of horizontal light fields and a plurality of vertical light fields arranged at predetermined first distance intervals, and one LFU among the multiple LFU structure is a square shape with the first distance interval as a length.

The processor is configured to generate a plurality of view images by using four light field areas comprising the selected LFU and the eight light field areas arranged adjacently to a surrounding of the plurality of light field areas.

The processor is configured to, based on a plurality of light fields being positioned within the allocated FOV and the plurality of light fields having shared light information based on the view position, generate one view image by using the plurality of light fields based on the shared light information.

The processor is configured to allocate four rendering FOVs in units of 90-degree, and generate four view images by using a light field corresponding to each of the four rendering FOVs.

The processor is configured to generate a view image by using pixel information corresponding to a rendering FOV area from among the light field corresponding to each of the FOV.

The processor is configured to incorporate by projecting the generated plurality of view images, and generate the 360-degree image by blending the incorporated view image.

A method of constructing a virtual space according to another embodiment of the disclosure includes determining a view position within a multiple light field unit structure in which a plurality of lights is arranged in a lattice structure, allocating a rendering field-of-view (FOV) in predetermined degrees based on the view position, generating a plurality of view images based on a plurality of light fields arranged adjacently with the view position from among the plurality of light fields and the allocated rendering FOV, and incorporating the generated plurality of view images.

The multiple LFU comprises the plurality of light fields arranged in the lattice structure, a shell of the lattice structure is a circular or an atypical structure.

The plurality of light fields may include a plurality of horizontal light fields and a plurality of vertical light fields arranged at predetermined first distance intervals, and one multiple light field unit (LFU) among the multiple LFU structure is a square shape with the first distance interval as a length.

The generating the plurality of view images may include generating a plurality of view images by using four light field areas comprising the selected LFU and eight light field areas arranged adjacently to a surrounding of the plurality of light field areas.

The generating the plurality of view images may include, based on a plurality of light fields being positioned within the allocated FOV and the plurality of light fields having a shared light information based on the view position, generating one view image by using the plurality of light fields based on the shared light information.

The allocating the field-of-view (FOV) may include allocating the four rendering FOVs in units of 90-degree, and the generating the plurality of view images may include generating four view images by using a light field corresponding to each of the four rendering FOVs.

The generating the plurality of view images may include generating a view image by using pixel information corresponding to a rendering FOV area from among the light field corresponding to each of the FOV.

The method of constructing a virtual space may further include incorporating by projecting the generated plurality of view images, and blending the incorporated view images.

A computer readable recording medium including a program for executing a method of constructing a virtual space according to an embodiment of the disclosure, the method including determining a view position within a multiple light field unit (LFU) structure in which a plurality of light fields is arranged in a lattice structure, allocating a rendering field-of-view (FOV) in predetermined degrees based on the view position, generating a plurality of view images based on a plurality of light fields arranged adjacently with the view position from among the plurality of light fields and the allocated rendering FOV, and incorporating the generated plurality of view images.

Effect of Invention

According to the various embodiments of the disclosure, a flexible connection method with respect to a multiple LF system may be provided by using the constant radiance of rays in LF theory. The flexibly connectable LF system may extend a range of a view position renderable under reasonable conditions of the camera, and extend a range of the view position renderable under reasonable conditions of the camera FOV. Because the suggested LFU may be stacked easily to a quadrangular structure, the suggested LFU provides an advantage of dramatically extending the range of a view search.

BEST MODE

Detailed Description of Exemplary Embodiments

Figure 1:
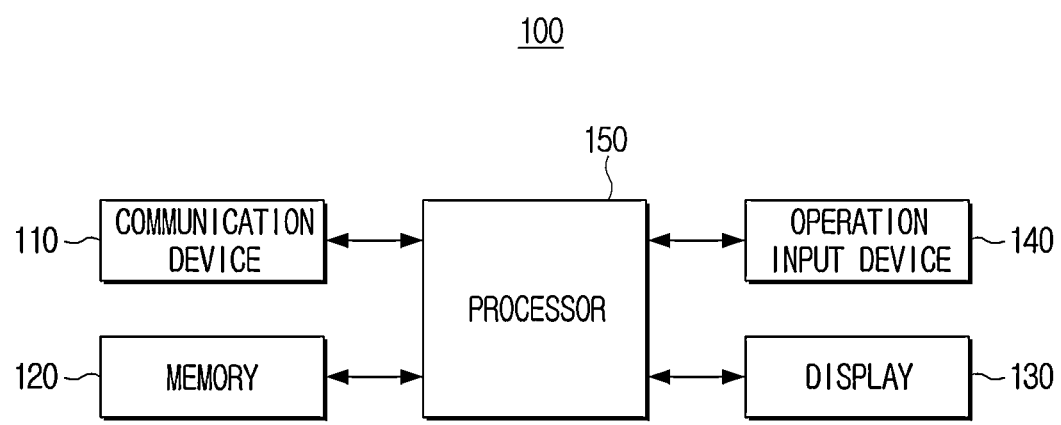
FIG. 1 is a block diagram illustrating a configuration of an electronic apparatus according to an embodiment of the disclosure.

Terms used in the disclosure will be briefly described, and the disclosure will be described in greater detail.

The terms used in the embodiments of the disclosure are general terms that are currently widely used identified into consideration of the functions of the various embodiments of the disclosure. However, these terms may vary depending on the intention, legal or technical interpretation, emergence of new technologies, and the like of those skilled in the related art. Also, in certain cases, there may be some terms arbitrarily identified by an applicant. In this case, the meaning thereof will be described in detail in the description part of the corresponding disclosure. Accordingly, the terms used herein may be construed based on the meaning of the term and the overall content, and not simply based on the designation of the term.

Various modifications may be made to the embodiments of the disclosure, and there may be various types of embodiments. Accordingly, specific embodiments will be illustrated with drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing embodiments, detailed description of related known technologies may unnecessarily confuse the gist of the disclosure, the detailed description will be omitted.

The terms such as "first" and "second," may be used to describe a variety of components, but the components should not be limited by these terms. The terms are used only for the purpose of distinguishing one element from another.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "unit" is used to refer to a component that performs at least one function or operation, and the component may be implemented as hardware or software, or a combination of hardware and software. Further, except for when each of a plurality of "modules" or "units" needs to be realized in an individual hardware, the components may be integrated in at least one module and be realized in at least one processor.

The embodiments of the disclosure have been described in detail with reference to the accompanying drawings to assist in the understanding of those of ordinary skill in the related art. However, the disclosure may be implemented in various different forms and the disclosure is not limited to the embodiments described herein. In the drawings, parts unrelated to the description for clearly describing the disclosure have been omitted, and like reference numbers have been affixed with respect to like parts throughout the disclosure.

The disclosure will be described in greater detail below with reference to the accompanying drawings.

FIG. 1 is a block diagram illustrating a configuration of an electronic apparatus according to an embodiment of the disclosure.

Referring to FIG. 1, the electronic apparatus 100 may be comprised of a communication device 110, a memory 120, a display 130, an operation input device 140, and a processor 150. The electronic apparatus 100 may be a personal computer (PC) capable of image processing, a notebook PC, a smartphone, a server, or the like.

The communication device 110 may, when connected to the external apparatus, transmit and receive information on the light field or the multiple LFU structure. Specifically, the communication device 110 is formed to connect the electronic apparatus 100 with the external apparatus, and the communication device may not only be in a form of connecting to a mobile device through a local area network (LAN) and internet network, but also a in a form of connecting through a universal serial bus (USB) port.

Here, light field (LF) refers to information described by characteristics of light that passes through a linear plane, and may be a linear light field generated by moving a camera capable of generating a light field in one direction. A more specific description of the light field will be provided below with reference to FIGS. 2 and 3.

The multiple LFU structure may be a structure in which the plurality of light fields is arranged in a lattice structure, and a shell of the corresponding lattice structure may have a circular or an atypical structure. The plurality of light fields may be comprised of a plurality of horizontal light fields and a plurality of vertical light fields arranged at first distance intervals, and the square shape within the lattice structure may be denoted as one LFU. The specific shape of the multiple LFU structure will be described below with reference to FIGS. 12 and 13.

The communication device 110 may be connected to other electronic apparatus by not only a wired method, but also via a router or an access point which connects to a shared internet network, and may be connected to the router by not only a wired method but also a wireless method such as Wi-Fi, Bluetooth, and cellular communication.

The communication device 110 may transmit the generated 360-degree image to the external apparatus. The communication device 110 may transmit the generated 360-degree image as is, and may transmit only the image area corresponding to the view direction of the user from among the 360-degree image. The external apparatus may be a VR device, a display apparatus, a server, or the like.

The communication device 110 may receive information on the view position and view direction from the external apparatus. The external apparatus may be a VR device, a sensor device capable of detecting a position of a user, or the like.

The memory 120 may be a component for storing an operating system (OS) for driving the electronic apparatus 100 or a software, data or the like for generating the 360-degree image. The memory 120 may be implemented in various forms such as, for example, and without limitation, a random access memory (RAM), a read only memory (ROM), a flash memory, a hard disk drive (HDD), an external memory, a memory card, or the like, and is not limited to any one thereto.

The memory 120 may store information on the multiple LFU structure with respect to the circular or atypical space. Further, the memory 120 may store the plurality of view images generated in a process which will be described below and/or a 360-degree image.

The display 130 may display a user interface window for functions supported by the electronic apparatus 100 to be selected. Specifically, the display 130 may display a user interface window for the various functions provided by the electronic apparatus 100 to be selected. The display 130 may be a monitor such as an LCD, a CRT, or an OLED, and may be implemented as a touch screen capable of simultaneously performing functions of an operation input device 140, which will be described below.

The display 130 may display the 360-degree image generated in the process which will be described below. The display 130 may display the generated 360-degree image as is, or display only a certain area within the 360-degree image corresponding to the current user view point.

The operation input device 140 may receive input of a function selection of the electronic apparatus 100 from the user and a control instruction with respect to the corresponding function. Specifically, the operation input device 140 may receive input of information on the view direction or the like of the user. The operation input device 140 described above may be coupled with the above-described display 130 apparatus and may be configured as one device, for example, a device such as a head mountable display, and may sense or receive input of information on a direction or position viewed by the user.

The processor 150 may perform control on each configuration within the electronic apparatus 100. Specifically, the processor 150 may, when a booting command is input from the user, perform booting by using an operating system stored in the memory 120. The processor 150 may be configured as a single device such as a central processing unit (CPU) and an application-specific integrated circuit (ASIC), or configured to a plurality of devices such as a CPU and graphics processing unit (GPU).

The processor 150 may determine the view position. Specifically, if the electronic apparatus 100 is a VR device, the processor 150 may determine the view position based on the current position of the VR device. If the electronic apparatus 100 operates connected with the VR device, the view position may be determined based on the position information received from the VR device. The view position as described above may be a specific position with the space defined as the multiple LFU structure.

The processor 150 may, when the view position is determined, use the stored multiple LFU structure and generate a 360-degree image based on the view position.

Specifically, the processor 150 may, when the view position is determined, select the LFU to which the view position belongs from among the multiple LFU structure. For example, a reference position within the multiple LFU structures 1200 and 1300 as in FIG. 12 or FIG. 13 may be determined, and the LFU to which the corresponding reference point belongs may be selected.

The processor 150 may allocate the rendering field of view (FOV) in predetermined degrees based on the view position. Specifically, the processor 150 may allocate the four rendering FOVs at 90-degree units. For example, four rendering FOVs comprised of front direction/back direction/left side direction/right side direction may be allocated based on the view position. The detailed descriptions of the allocating operation will be described below with reference to FIG. 8.

The processor 150 may generate a plurality of view images based on the plurality of light fields comprising the selected LFU and the allocated FOV. The processor 150 may generate the plurality of view images by using the four light field areas comprising the selected LFU and the eight light field areas disposed adjacent to the surrounding of the plurality of light field areas. The processor 150 may, when the plurality of light fields are used to one rendering FOV, generate one view image by connecting the plurality of light fields based on information on the shared light of the plurality of light fields. The operation described above will be described below with reference to FIGS. 4 and 5.

Then, the processor 150 may incorporate the generated plurality of view images and generate the 360-degree image. For example, the processor 150 may incorporate by projecting each of the generated plurality of view images and generate the 360-degree image by blending the incorporated view image.

As described above, the electronic apparatus 100 according to an embodiment may easily generate a 360-degree image by using the multiple LFU structure, and extend a view search range within the multiple LFU structure through the process above.

In illustrating and describing FIG. 1, the electronic apparatus 100 has been illustrated and described as comprising a plurality of configurations, but some from among the illustrated configurations may be omitted in the implementation. In addition, when the electronic apparatus 100 is implemented as a VR device, devices such as a sensor may be further included for detecting the position of the user and the view direction of the user.

The operation for constructing a virtual space by using the light field method will be described in detail below.

The light field (LF) method is an approach method which may be used in increasing the number of DoF. In a LF-based VR system, light of a free space may be densely obtained and from a virtual perspective, light may be rendered through a combination of light. Unlike a 3D modelling, a complicated calculation is not required for obtaining a correct geometrical information.

The view of the LF in theory is a combination of light, but the actual rendering uses the corresponding captured pixels. Accordingly, the rendered view is very realistic. Free-viewpoint TV (FTV) suggests an LF system which uses a 1D or a 2D linear camera array structure in which view change of an x-axis, y-axis, z-axis conversion is supported. However, because of an arrangement of one-way camera, a rotating view change may not be allowed, and the system may also not generate a 360-degree image.

The spherical LF system may arrange several cameras in a circular or circular shape, and allow for 6-DoF position tracking. The spherical-LF based VR system was recently verified by Google™. However, a camera with a high field-of-view (FOV) of 180-degrees is required to generate a complete 360-degree field-of-view from all view positions within the spherical structure. If a smaller FOV than of 180-degrees is applied, the range of the view position capable of performing rendering may be reduced. That is, this system may have a low structure usability.

A high FOV camera such as a camera mounted with a fisheye lens may be considered, but it is not appropriate because of significant distortion, and optical density at the edges of the image drop considerably. The aforementioned spherical and 1D/2D linear LF comprises an LF based on an assumption of a specific plane and using light which passes through the corresponding plane. The single plane assumption limits scalability.

Light, which does not pass through the plane, may not be obtained regardless of how much the size of the plane is extended. To solve this problem, Rayspace360 suggests using two or more planes. Multiple LFs may be connected through shared light obtained commonly from a physical cross point. Ray-space360 connects four 1D linear LFs, and may generate a 360-degree view from an arbitrary view position. However, the shared light for connecting the two LFs may only be obtained from a physical cross point. The amount of shared light may be varied according to the camera FOV capable of limiting the range of the renderable view position.

In general, there are 3 types of DoFs in a captured image-based virtual reality system, and here only the rotating user movement for view rendering may be tracked. This may be the main reason for the decrease in sense of reality.

A 3DoF+VR system which supports not only rotation, but also conversion view change for raising user immersivity similar to a real world has been suggested. Because the light field method simply combines light and performs rendering of the view from a free view position, the light field method is suitable for 3DoF+VR of this type.

However, because the previous method assumes a single LF for obtaining and representing light, scalability was limiting. In order to expand LF, several LFs may be connected at the physical cross point. However, the fixed connecting-point may limit the renderable view range and the layout of various LF.

In addition, in conventional single or multiple LF systems, the representable range of the view position relies heavily on the input observing view of the camera used. In order to realize a wide view search range, the above described limitation must be overcome.

To overcome the limitation, the disclosure suggests a flexible connection method with respect to the multiple LF system by using constant brightness of light.

The flexibly connectable LF system may expand the range of renderable view position under a reasonable condition of the camera. The suggested flexibly connectable LF system may expand the range of the renderable view position under a reasonable condition of the camera FOV which uses the suggested flexible connection. Each LFU may have a quadrangular structure, and the multiple FLU in which a plurality of LFU is stacked may be implemented in various forms. The structure as described above has the advantage of dramatically expanding the range of the view search. Through the above, the disclosure may achieve 3DoF+VR with not only superior quality but also with high scalability.

Figure 2:
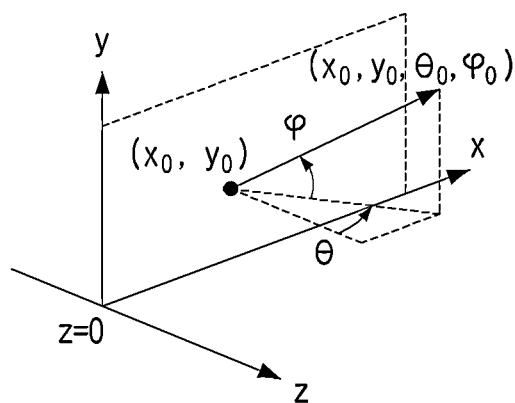
FIG. 2 is a diagram illustrating a linear plane and light passing through the linear plane according to an embodiment of the disclosure.
Figure 3:
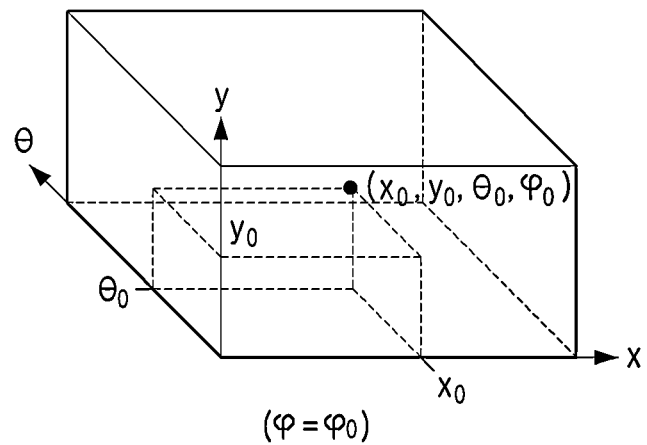
FIG. 3 is a diagram illustrating light represented as a point in LF according to an embodiment of the disclosure.

FIG. 2 is a diagram illustrating a linear plane and light passing through the linear plane according to an embodiment of the disclosure, and FIG. 3 is a diagram illustrating light represented as a point in an LF according to an embodiment of the disclosure.

Referring to FIGS. 2 and 3, in order to represent the light field, a 1D or 2D linear structure is most commonly used. The above-described structure assumes a single linear plane and represents light passing through it. In FIG. 2, a plane of z=0 is defined. The light which passes through the plane may be represented by four variables of passing position (x, y) and horizontal angle (θ, φ). In FIG. 3, the light is represented by points.

By using the obtained high-density image set, a linear light field may be generated. Specifically, the 1D linear LF may disregard a vertical parallax and simply light representation. The light may be easily obtained by arranging several cameras or scanning one camera along the plane.

The 1D or 2D LF approach method of this type may mainly be a small reference line, and may be widely used in various fields such as super-resolution, depth estimation, and refocusing based on the LF. However, because the linear LF is comprised of light in one direction, a view which reflects the rotation motion may not be generated. Based on the above, there is the difficulty of using only this method in a VR application.

Unlike the linear LF, the spherical/circular LF system may obtain light from a 360-degree direction. Accordingly, a 360-degree view may be created. Because changes in transforming view and rotate view are both allowed, the result of 6-DoF may be provided. The spherical LF was recently verified by Google. Google uses two types of camera equipment for obtaining purposes. The two cameras at opposite directions may be rotated in a spherical form or sixteen multiple cameras arranged vertically may be rotated drawing a circle. When the spherical LF is formed, the 360-degree view at an inside position of the spherical form may be freely rendered by combining the light in the spherical LF. Unfortunately, as the view position grows closer to the spherical plane, light passing through the plane with a very high incident angle is required. That is, a 180-degree camera FOV is required to completely cover the inner spherical structure.

The 1D/2D linear LF and the spherical/circular LF approach method assumes a single LF, whereas Ray-space360 uses four linear LFs to provide a 360-degree view which may not be realized by using the single linear LF. The two independent linear LFs may be connected by using light passing through the physical cross point of the adjacent LF. Four 1D LFs may be connected from four cross points through a shared light and one large-scale LF may be used. Like the spherical LF, Ray-space360 requires light with high incident angle when the view position moves more closely to the plane.

Light in the LF may be represented by using free space (x, y, z), horizontal and vertical angles (θ, Φ), wavelength (λ), and seven parameters of 3D coordinates in time (t). In general, 5D representation may be possible because pixel values are used in a frame and time and wavelength parameters may be disregarded. Because the light which passes through the free space is of a constant brightness according to the path, the 5D representation may still include some redundancy. The FTV system defines light passing through one point of the plane at a horizontal and vertical angle and uses a 4D representation.

The simplified 4D representation is the most commonly adopted implementation for practical purposes, and the 1D/2D linear LF and the spherical/circular LF are the main examples. These LFs each assume a specific plane, a linear plane for the 1D/2D linear LF and a spherical/circular plane for the spherical/circular LF, and define the light incident representation of the plane. Specifically, the assume plane may simplify the light representation and camera arrangement, but there is a limit to scalability. By extending the size of the plane, the amount of implementable light may be increased, but it may not be possible to form a LF which is not passing through the plane.

To solve this problem, several LF connections may be required. The most intuitive method of connecting several LFs may be utilizing shared light inspired from image stitching by using overlapping pixel areas. Below, a method of utilizing shared light will be described with reference to FIG. 4.

Figure 4:
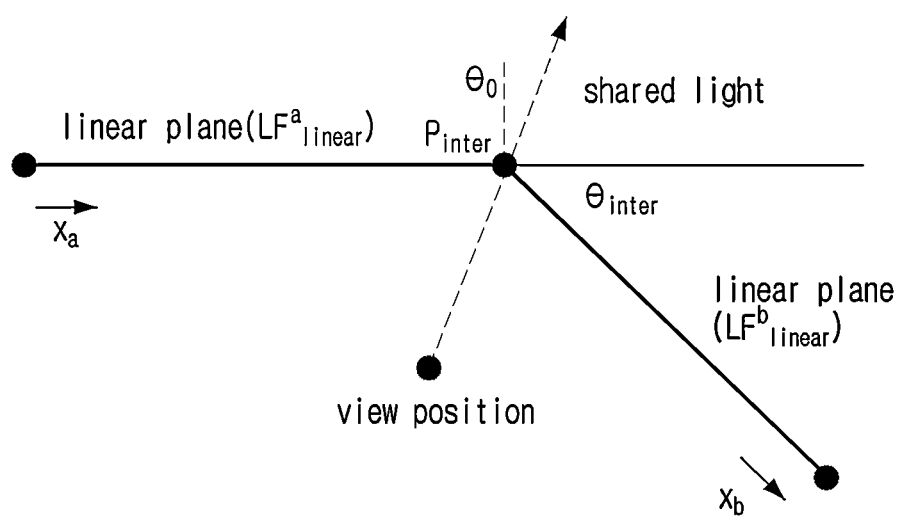
FIG. 4 is a diagram illustrating a connection between two linear LFs when two linear planes are crossed according to an embodiment of the disclosure.

FIG. 4 is a diagram illustrating a connection between two linear LFs when two linear planes are crossed according to an embodiment of the disclosure. In FIG. 4, an example of two 1D LFs displayed as linear LF is illustrated.

Referring to FIG. 4, the two thick black lines represent a plane to which light passes through and comprise a linear LF. Each x-axis represents a horizontal axis of a plane. The two $LF_{linear}$ may include a $P_{inter}$ which is a cross point, and light which passes through $P_{inter}$ belong to both $LF_{linear}$ which is defined as shared light. The dotted line arrow represents the view position represented by equation 1 and the shared light.

<Equation 1>

$$LF^a_{linear} \cap LF^b_{linear} = \{(x_a, \theta_a) \mid x_a = P_{inter}, \theta_a = \theta_o\} = \qquad \text{⟨Equation 1⟩}$$

$$\{(x_b, \theta_b) \mid x_b = P_{inter}, \theta_b = \theta_o - \theta_{inter}\}$$

In equation 1, $x_a$ and $x_b$ represent a horizontal axis on the LF linear plane, while $\theta_a$ and $\theta_b$ also represent the incident angle of light present at the two x-axes. The shared light passes through the same point in xa and xb.

The incident angle of the shared light may be defined as $\theta_0$ in $LF^a_{linear}$, and defined as $(\theta_0-\theta_{inter})$ in $LF^b_{linear}$. Here, $\theta_{inter}$ is determined by the angle of the crosspoint, which may be reflected in equation 1.

The correlation of the two LFs may be established through the shared light, and may be used as a bridge for utilizing a multiple $LF_{linear}$ as a single $LF_{linear}$. The connection of this type is performed at a fixed physical cross point. Further, based on the view position, the incident angle which requires the shared light may be dramatically increased.

In the LF theory, if a constant brightness of a light is actively used, a plurality of LFs may be connected even if the corresponding plane is not physically crossed. The operation described above will be described below with reference to FIG. 5.

Figure 5:
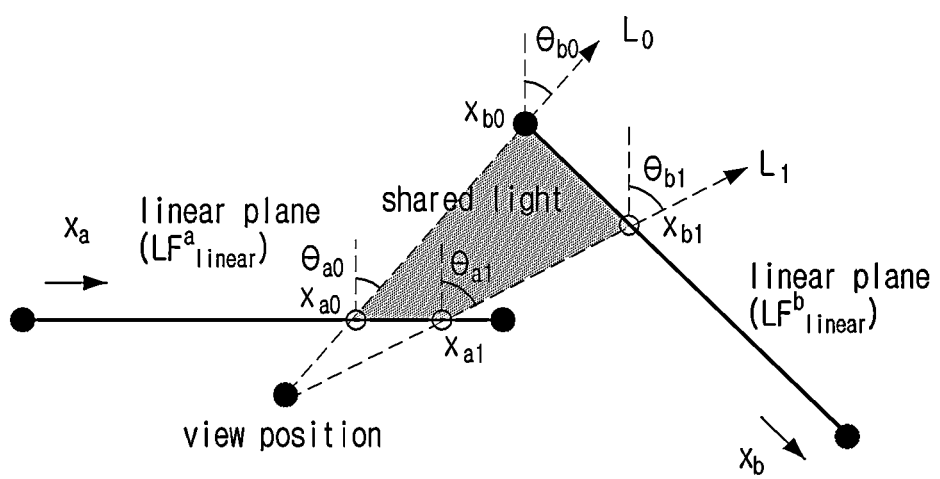
FIG. 5 is a diagram illustrating a connection between two linear LFs when two linear planes are not crossed according to an embodiment of the disclosure.

FIG. 5 is a diagram illustrating a connection between two linear LFs when two linear planes are not crossed according to an embodiment of the disclosure.

Referring to FIG. 5, an example of two $LF_{linear}$ without physical connection is illustrated. However, light which may be obtained from the light path functions as a shared light connecting the two $LF_{linear}$. The group of shared light at the view position in FIG. 5 may be represented in Equation 2.

<Equation 2>

$$LF^a_{linear} \cap LF^b_{linear} = \{(x_a, \theta_a) \mid x_{a0} \leq x_a \leq x_{a1}, \theta_{a0} \leq \theta_a \leq \theta_{a1}\} = \langle \text{Equation 2} \rangle$$
$$\{(x_b, \theta_b) \mid x_{b0} \leq x_b \leq x_{b1}, \theta_{b0} \leq \theta_b \leq \theta_{b1}\}$$

As in equation 2, the shared light may pass through a certain range of the x-axis. Unlike the light shared in equation 1, there may be several shared lights, and may pass through another point in the x-axis. These shared light may define the correlation between the two $LF_{linear}$ and may be used as a bridge connecting the two.

Unlike the method described in FIG. 4, this approach method may flexibly connect the multiple $LF_{linear}$ by selecting a portion of the shared light from various points of the plane.

This strategy allows for long distance shared light to be used rather than the adjacent shared light which requires a high incident angle. For example, $L_0$ and $L_1$ light are a shared point of two $LF_{linear}$.

While the distance of the two positions of $L_1$ is closer than $L_0$, the incident angle of $L_0$ is lower than $L_1$. If $L_0$ is selected as shared light rather than $L_1$, the burden of camera FOV may be reduced. Accordingly, a dependency on camera FOV may be greatly reduced. In addition, the condition that LF linear has to be physically adjacent may also be mitigated.

Figure 6:
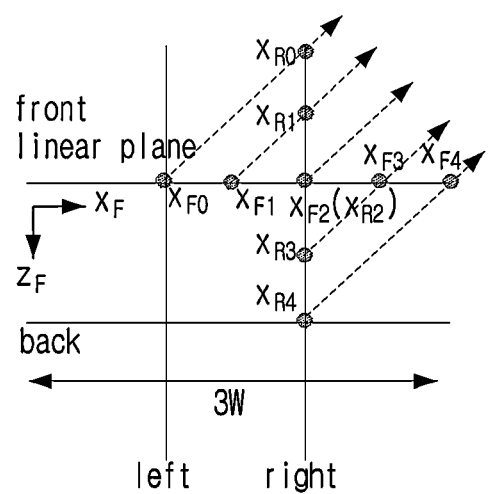
FIG. 6 is a diagram illustrating a number of lights shared in an LFU structure according to an embodiment of the disclosure.
Figure 7:
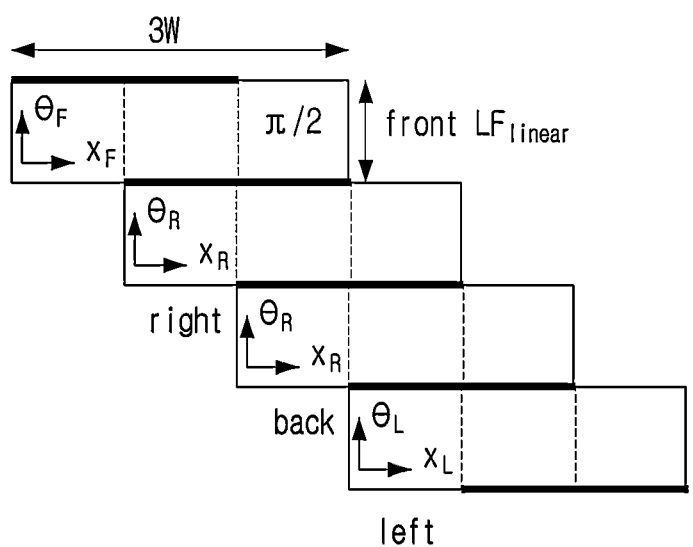
FIG. 7 is a diagram illustrating a relationship between linear LFs in a LFU structure according to an embodiment of the disclosure.

FIG. 6 is a diagram illustrating a number of lights shared in an LFU structure according to an embodiment of the disclosure, and FIG. 7 is a diagram illustrating a relationship between linear LFs in a LFU structure according to an embodiment of the disclosure.

Referring to FIGS. 6 and 7, due to the suggested flexible connection method, there are a plurality of shared light candidates which may be used in the LF connection. Based on the above, a light field unit (LFU) may be realized. LFU assumes four $LF_{linear}$ according to the simplified 2D representation method.

The four black lines of FIG. 6 may be a linear plane for LF linear configuration. When compared with Rayspace360, the length of the plane is extended to the four directions by W. The $LF_{linear}$ obtained from the extended plane may be connected to the adjacent $LF_{linear}$ by applying the suggested flexible connection method.

The five dotted-line arrows of FIG. 6 represent an example of the shared light between the front surface and the right side $LF_{linear}$. Five lights may be obtained with incident angle+$\pi/4$ from an $x_{F0}$, $x_{F1}$, $x_{F2}$, $x_{F3}$, $x_{F4}$ position of the right x-axis. From the $x_{F0}$, $x_{F1}$, $x_{F2}$, $x_{F3}$, $x_{F4}$ position on the right x-axis, the exactly same light may be obtained with incident angle $-\pi/4$ assuming the constant brightness of light passing through a free space. The connecting point of x-axis may be increased and extremely flexible compared with when using a cross point-based connection FIG. 7 represents a $\theta-x$ plane of four $LF_{linear}$. Because the linear plane of each direction assumes the length of 3W and FOV as 90-degrees, the size of each $LF_{linear}$ may be 3W×$\pi/2$.

The thick gray line on the $\theta-x$ plane of FIG. 7 represents the shared light. The light shared by the two adjacent $LF_{linear}$ may be obtained from various positions of the x-axis of incident angle+$\pi/4$ or $-\pi/4$.

Based on the shared light being obtained at various points, the connection between the $LF_{linear}$ may become very flexible. Further, taking into consideration the flexible connection, the incident angle of shared light may have a fixed value of $\pm\pi/4$. Thus, the required camera FOV of the suggested LFU may be reduced to 90-degree. When a 90-degree FOV which is easily provided with a typical camera is provided, a 360-degree view may be rendered from all view positions of the structure. This is significantly smaller and realistic than the 180-degree camera FOV required by the conventional LF system.

The structural change of LFU as described above may simply the rendering process. Below, the rendering operation according to the changed structure will be described with reference to FIGS. 8 and 9.

Figure 8:
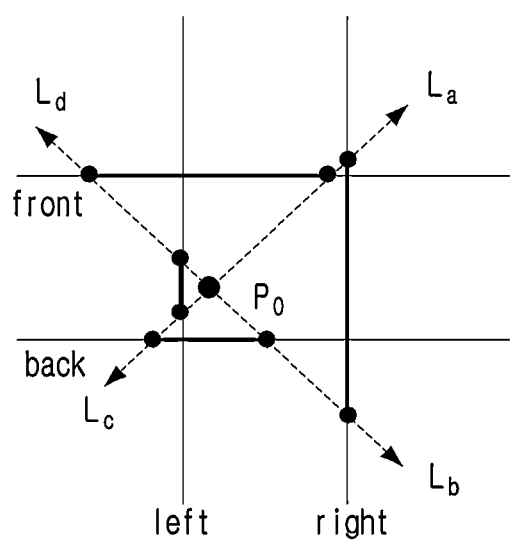
FIG. 8 is a diagram illustrating an operation for allocating rendering range from a view position in a LFU rendering process according to an embodiment of the disclosure.

FIG. 8 is a diagram illustrating an operation for allocating rendering range from a view position in a LFU rendering process according to an embodiment of the disclosure.

Referring to FIG. 8, when an arbitrary view position $P_0$ is provided, the LFU to which the corresponding view position belongs may be selected, and four rendering FOVs may be allocated to four directions (front direction/back direction/left side/right side) based on the corresponding view position.

Specifically, the multiple LFU may be configured so that the plurality of light fields is arranged in the lattice structure as illustrated, and may be comprised with light fields of a horizontal direction ($LF_{front}$, $LF_{back}$) and light fields of a vertical direction ($LF_{left}$, $LF_{right}$). The one LUF may be quadrangular at the center of the illustrated structure, and the corresponding LFU may be comprised of a portion of the area of the upper light field, a portion of the area of the right light field, a portion of the area of the lower light field, and a portion of the area of the left light field.

In order to provide a 90-degree FOV, not only the four light field areas comprising the one LFU, but also the eight light field areas arranged adjacently with the corresponding light field may be used together as illustrated.

When the FOV is allocated, shared light may be selected from the axes of each direction. The shared light such as $L_a$, $L_b$, $L_c$, $L_d$ which connects the four $LF_{linear}$ may be represented as a dotted line arrow. The rendering range allocated with respect to each $LF_{linear}$ may always be $\pi/2$ regardless of the view position.

For example, with respect to the front surface direction, the $LF_{front}$ area displayed with dark straight lines and the area on the dark straight line of $LF_{right}$ may be connected by using the method as described in FIG. 5.

Figure 9:
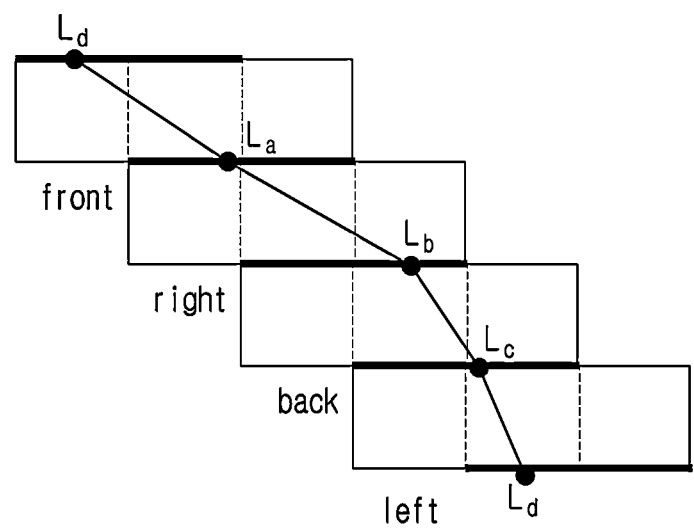
FIG. 9 is a diagram illustrating a form of light connection from a view position in an LFU rendering process according to an embodiment of the disclosure.

FIG. 9 is a diagram illustrating a form of light connection from a view position in an LFU rendering process according to an embodiment of the disclosure.

Referring to FIG. 9, a method of selecting a group of light with respect to each $LF_{linear}$ for securing field-of-view and a method of connecting the group of light through shared light to generate the 360-degree image are shown.

The extended length of the linear plane and the camera FOV are complementary to the LFU structure. If the camera FOV is significantly large, there is no need to extending the linear plane. If not, the small FOV may extend the plane length and receive compensation. The relationship described above will be described below with reference to FIG. 10.

Figure 10:
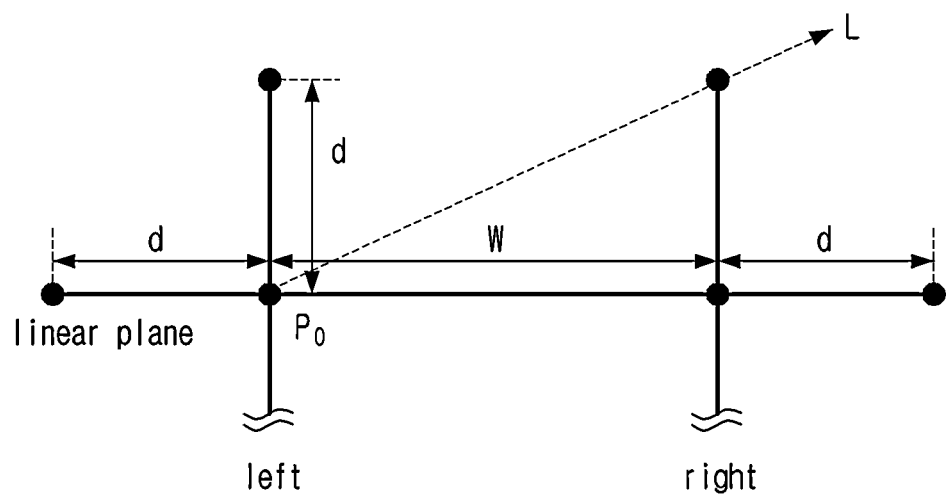
FIG. 10 is a diagram illustrating a relationship between an extended length of the linear plane and a desired camera FOV according to an embodiment of the disclosure.

FIG. 10 is a diagram illustrating a relationship between an extended length of the linear plane and a desired camera FOV according to an embodiment of the disclosure.

Referring to FIG. 10, the extended length of the linear plane may be represented as d. It is assumed that Light L is required at view position P0. L in the LFU extended structure functions as a shared light which may be obtained from all of the front surface and right side linear plane and connects the two $LF_{linear}$. The input FOV $\theta_{in}$ necessary in obtaining L may be calculated by using equation 3.

$$\frac{\theta_{in}}{2} = \cot^{-1}\left(\frac{d}{W}\right) \ (o \leq d \leq W) \quad \langle \text{Equation 3} \rangle$$

In equation 3, W represents the basic length of the linear plane prior to extension, whereas d represents the extended length. If d is 0, $\theta_{in}$ becomes $\pi$ and refers to the same system as Ray-space360. If d is extended to W/2, $\theta_{in}$ becomes about $\pi/1.4$, and if d is extended to W, $\theta_{in}$ may arrive at $\pi/2$. Even if d is greater than W, the required FOV may not be reduced further.

In order to form a 360-degree image in a quadrangular structure, a rendering FOV of $\pi/2$ or more may all be allocated to the four directions, and the input FOV may not be smaller than the rendering FOV. In the disclosure, d may be set to a maximum value of W.

The reason for the above may first be to minimize the distortion of the captured-image by reducing the required input FOV. Secondly, because the extended linear plane may be hidden in the multiple LFU structure, there is no longer a burden to add a camera.

In a conventional LF system, the view search range may be limited. This complicates the use of the system when trying to provide a proactive experience. However, the LFU according to an embodiment of the disclosure comprises a quadrangular camera structure and may easily stack the several LFUs. In other words, the scale of experience may be expanded by the desired quantity. The expanding operation as described above will be described below with reference to FIG. 11.

Figure 11:
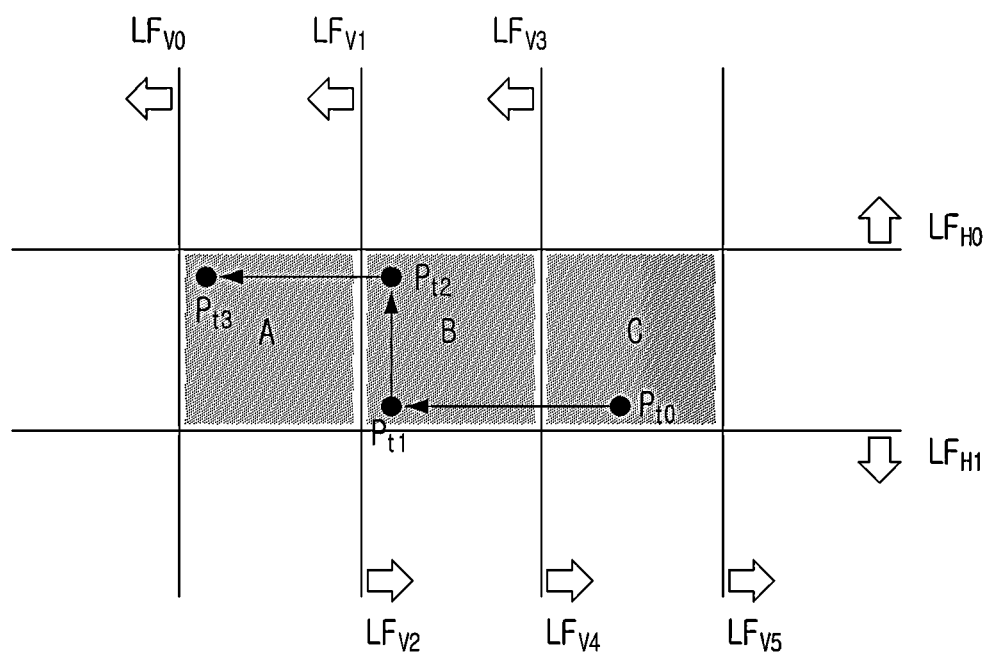
FIG. 11 is a diagram illustrating an example of a multiple LFU and a view search scenario according to an embodiment of the disclosure.

FIG. 11 is a diagram illustrating an example of a multiple LFU and a view search scenario according to an embodiment of the disclosure.

Referring to FIG. 11, an example of three LFUs such as $LFU_A$, $LFU_B$, and $LFU_C$ being horizontally stacked is shown. The black line represents the linear plane.

The example may be comprised of two $LF_{linear}$ ($LF_{H0}$ and $LF_{H1}$) in the horizontal direction and six $LF_{linear}$ ($LF_{V0}$, $LF_{V1}$, $LF_{V2}$, $LF_{V3}$, $LF_{V4}$, $LF_{V5}$) of the vertical direction.

The $LF_{V1}$ and $LF_{V2}$ may obtain light in the opposite direction from the same plane. The $LF_{V3}$ and $LF_{V4}$ may also share the same plane. The $LF_{UA}$ may be comprised of four $LF_{linear}$ of $LF_{V0}$, $LF_{V2}$, $LF_{H0}$, and $LF_{H1}$.

In the same method, $LF_{UB}$ may be comprised of $LF_{V1}$, $LF_{V4}$, $LF_{H0}$, and $LF_{H1}$, and $LF_{UC}$ may be comprised of $LF_{V3}$, $LF_{V5}$, $LF_{H0}$, and $LF_{H1}$. In this structure, the view range which may perform rendering of the 360-degree image may be a gray area, and the size may be $3-W^2$. The multiple LFU stacking may not hide the extended length. The LFU structure as described above may extend the linear plane to be longer than the structure of the Ray-space360 system.

In FIG. 11, three LFUs share $LF_{H0}$ and $LF_{H1}$. When selecting a multiple LFU structure such as the above, the required length of the linear plane may be 3 W·6=18 W vertically and 5 W·2=10 W horizontally, rather than 3·3W·4=36 W. That is, as the LFU which is stacked horizontally and vertically increases, the burden of the extended linear plane is greatly reduced.

The arrow in FIG. 11 may indicate a trajectory of view position along the $P_{t0}$, $P_{t1}$, $P_{t2}$, $P_{t3}$ points.

The LFU may be selected according to the provided view position. After selecting $LF_{UC}$ from the initial view position $P_{t0}$, a 360-degree image may be rendered by using $LF_{V3}$, $LF_{V5}$ and $LF_{H0}$ and ⅗ portion of the right side of $LF_{H1}$.

Next, assuming that the view position is moved to the left side and positioned at $P_{t1}$ point in the $LF_{UB}$ structure, $LF_{V1}$, $LF_{V4}$ and $LF_{H0}$ and the ⅗ of the center part of $LF_{H1}$ may be used in the rendering.

The next view position $P_{t2}$ may still be in $LF_{UB}$ and the same $LF_{linear}$ may be used. In the last view position $P_{t3}$ of $LF_{UA}$, $LF_{V0}$, $LF_{V2}$ and $LF_{H0}$ and ⅗ portion of the left side of $LF_{H0}$ and $LF_{H1}$ may be used to generate the 360-degree image.

Figure 12:
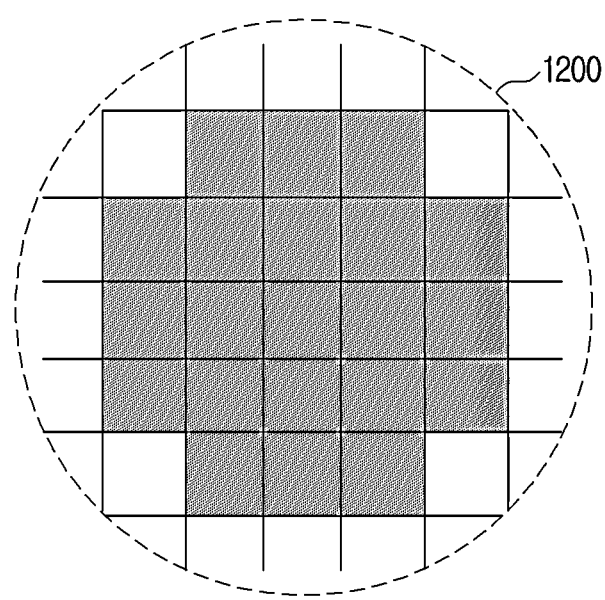
FIGS. 12 and 13 are diagrams illustrating an example of a multiple LFU structure according to space according to an embodiment of the disclosure.
Figure 13:
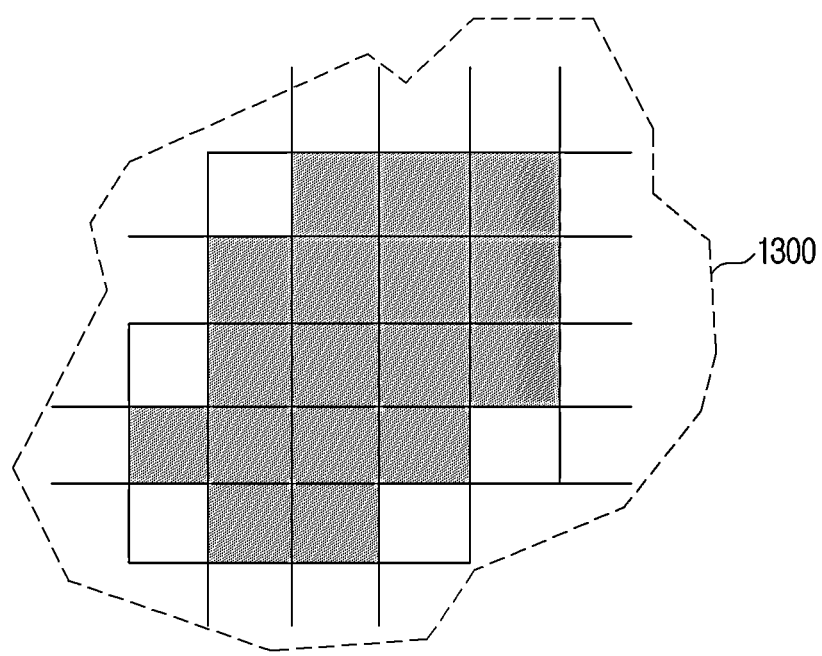

FIGS. 12 and 13 are diagrams illustrating an example of a multiple LFU structure according to space according to an embodiment of the disclosure. Specifically, FIG. 12 is a diagram illustrating a structure of arranging the multiple LFU structure to represent a circular space, and FIG. 13 is a diagram illustrating a structure of arranging the multiple LF structure in an atypical shape.

Referring to FIGS. 12 and 13, the LFU may be freely stacked regardless of shape and/or size.

The multiple LFU may verify that the plurality of light fields is arranged in the lattice structure. Specifically, the plurality of horizontal light fields and the plurality of vertical light fields may be arranged in the lattice structure which are arranged at predetermined first distance intervals, and one square within the lattice structure may comprise one LFU. The each of the four light segments which comprise the one LFU may be designated as a light field area.

The view point may be positioned within the illustrated multiple LFU structure, and when generating a 360-degree image, the image may be generated by using a multiple light field unit to which the view point belongs. Because the view point may move freely within the illustrated multiple LFU structure, the range of the renderable view position may be expanded under a reasonable condition of the camera. In addition, when there is 1 to N number of multiple light field units, a 360-degree image may be generated by using not only the adjacent multiple light fields, but also the multiple light units that are physically distant through the shared light which functions as a bridge.

The quality of the LF configuration through the multiple LFU approach may be related to the size of the single LFU, and a finer edge area may be represented with the small size of the signal LFU. However, the number of LFUs necessary in covering the same space may be increased. Correspondingly thereto, the increase in the amount of LF data may also be significant. As a result, a tradeoff is generated between the correct spatial representation and amount of required LF data, and there is a need for determining an appropriate LFU size according to the characteristic of the application or the space to be covered.

Figure 14:
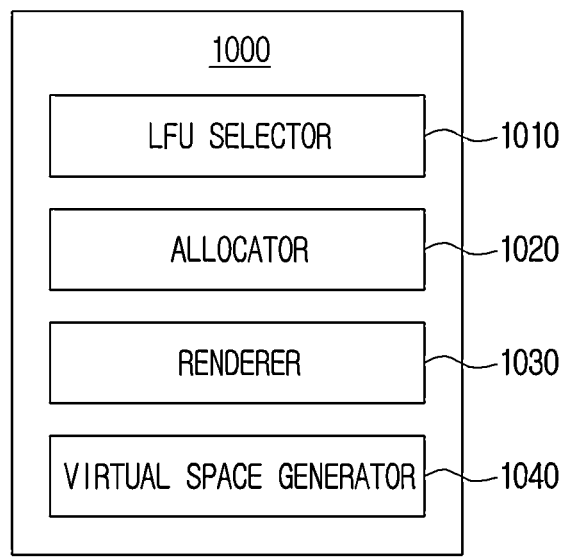
FIG. 14 is a diagram illustrating a specific configuration of a processor of FIG. 1.

FIG. 14 is a diagram illustrating a specific configuration of a processor of FIG. 1.

Referring to FIG. 14, the light field based virtual space construction apparatus 1000 may include an LFU selector 1010, an allocator 1020, a renderer 1030, and a virtual space generator 1040. Here, the light field-based virtual space construction apparatus may be the electronic apparatus of FIG. 1.

Figure 16:
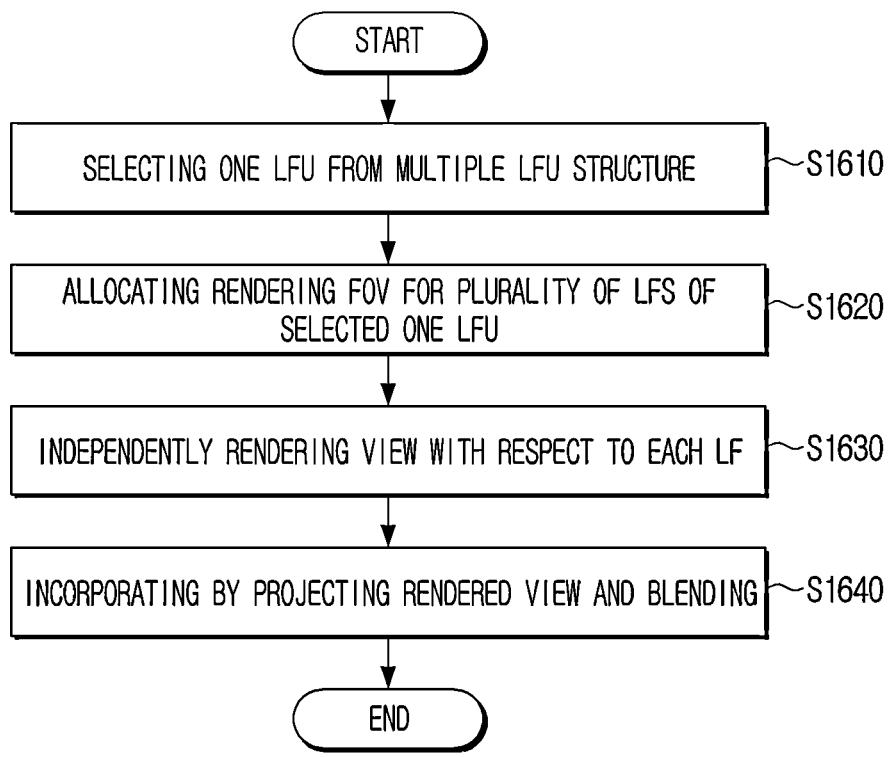
FIG. 16 is a flowchart illustrating in detail an operation of generating a 360-degree image of FIG. 15.

The LFU selector 1010, the allocator 1020, the renderer 1030, and the virtual space generator 1040 may be configured to perform the steps 210 to 240 of FIG. 16.

The LFU selector 1010 may select one LFU from the multiple light field unit (LFU) structure.

The allocator 1020 may allocate the rendering field-of-view (FOV) for the plurality light fields of the selected one LFU. The plurality of LFs may be connected without a physical cross point of the linear plane by using a constant brightness of light for connecting the multiple linear planes by selecting a portion of shared light from a plurality of points of the linear plane. The length of the linear plane may be extended to four directions, and the linear LF obtained from the extended plane may be connected by selecting a portion of shared light from a plurality of points of the linear plane. By reducing the required input FOV, the extended length of the linear plane for reducing distortion of the captured image may be extended to a maximum of the basic length of a linear plane prior to being extended.

The renderer 1030 may independently render the view with respect to each LF, and the virtual space generator 1040 may incorporate by projecting the rendered view and perform blending.

The apparatus described in the above may be implemented as a hardware component, a software component, and/or a combination of the hardware component and the software component. For example, the apparatus and component described in the embodiments may be implemented by using, one or more generic-purpose computers or a special purpose computer such as, for example, and without limitation, a processor, a controller, an arithmetic logic unit (ALU), a digital signal processor, a microcomputer, a field programmable array (FPA), a programmable logic unit (PLU), a microprocessor, or another specific apparatus capable of executing and responding to instructions. The processing device may execute an operating system (OS) and one or more software applications which is performed on the operating system. In addition, the processing apparatus may respond to the execution of a software, and access, store, manipulate, process and generate data.

For convenience of description, the processing apparatus may be described in some cases as using one, but it will be known those of ordinary skill in the related art that the processing apparatus may include a plurality of processing elements and/or a multiple types of processing element. For example, the processing apparatus may include a plurality of processors or one processor and one controller. Further, like a parallel processor, other processing configurations may also be possible.

A software may include a computer program, a code, an instruction, or a combination of one or more therefrom, and may configure the processing apparatus to operate as desired or may independently or collectively instruct the processing apparatus. The software and/or data may be interpreted by a processing apparatus or may be embodied to a machine of certain type, a component, a physical apparatus, a virtual equipment, a computer storage medium or an apparatus to provide an instruction or data to the processing apparatus. The software may be distributed on a computer system connected to a network, and stored or executed in the distributed method.

The software and data may be stored in one or more computer readable recording mediums.

The method according to an embodiment may be implemented in a form of a program instruction capable of being performed through various computer means and may be recorded in a computer readable medium. The computer readable medium may singularly or in combination include a program instruction, a data file, a data structure, or the like. The program instruction which may be recorded in the medium may be specially designed or configured for the embodiments or may be usable by being known to those skilled in the art of computer software. Examples of a computer readable recording medium may include a magnetic media such as a hard disk, a floppy disk, and a magnetic tape, an optical media such as a CD-ROM and DVD, a magneto-optical media such as a floptical disk, and a hardware device specially configured to store and perform computer instructions such as a ROM, a RAM, and a flash memory.

Examples of a computer instruction may include not only machine language code such as those created by a compiler but also high-level language code executable by a computer using an interpreter or the like.

Figure 15:
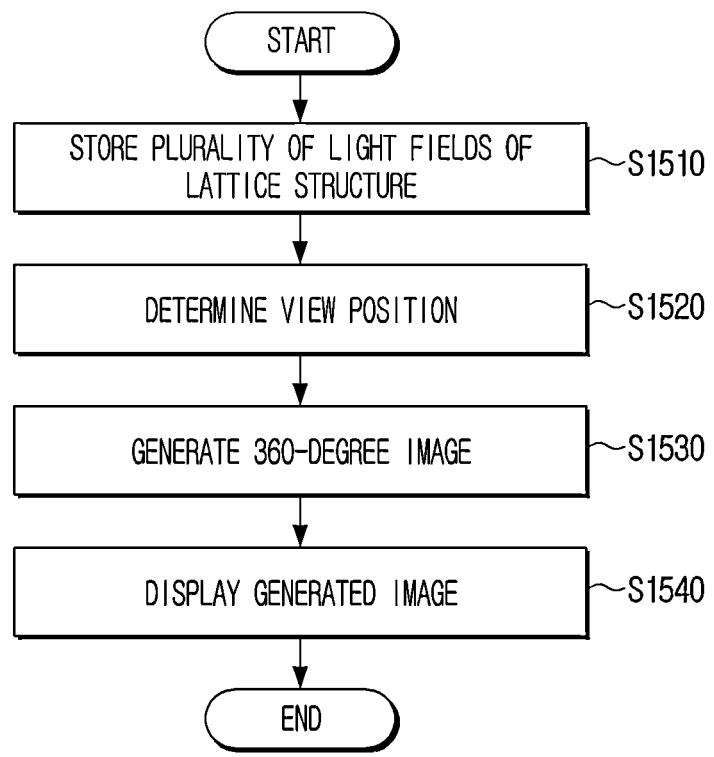
FIG. 15 is a flowchart illustrating a method of generating a virtual space according to an embodiment of the disclosure.

FIG. 15 is a flowchart illustrating a method of generating a virtual space according to an embodiment of the disclosure.

Referring to FIG. 15, first, the plurality of light fields may store the multiple light field unit (LFU) structure arranged as a lattice structure (S1510).

The view position within the multiple LFU structure may be determined (S1520).

Then, by using the determined view position and the multiple LFU structure, a 360-degree image may be generated (S1530). The operation of generating a specific 360-degree image will be described below with reference to FIG. 16.

Then, the generated 360-degree image may be displayed or provided to the external apparatus (S1540).

Accordingly, the method of generating a virtual space according to an embodiment of the disclosure may easily generate a 360-degree image by using the multiple LFU structure, and expand the view search range within the multiple LFU structure through the method above. In addition, the method of generating a virtual space according to an embodiment of the disclosure may, because the multiple light field units (LFU) may be freely moved through the shared light, the connectable LF system may expand the range of the renderable view position under a reasonable condition of the camera.

The suggested flexibly connectable LF system may expand the range of the renderable view position under a reasonable condition of the camera FOV which uses the suggested flexible connection. The LFU may easily be stack in the quadrangular structure. This provides the advantage of being able to dramatically expand the range of the view search. The suggested LFU may achieve 3DoF+VR with not only superior quality but also high scalability.

The method of generating the virtual space as in FIG. 10 may be executed on an electronic apparatus which includes the configuration of FIG. 1, and may be executed on an electronic apparatus which includes other configurations in addition thereto.

The method of constructing a virtual space as described above may be implemented as a program including an executable algorithm which may be executed in the computer, and the above-described program may be provided by being stored in a non-transitory computer readable medium.

The non-transitory computer readable medium refers to a medium that stores data semi-permanently rather than storing data for a very short time, such as a register, a cache, a memory or etc., and is readable by a device. In detail, the programs for performing the above-described various methods may be stored and provided in the non-transitory computer readable medium such as, for example, and without limitation, a compact disc (CD), a digital versatile disc (DVD), a hard disc, a Blu-ray disc, a universal serial bus (USB), a memory card, a read only memory (ROM), and the like.

FIG. 16 is a flowchart illustrating in detail an operation of generating a 360-degree image of FIG. 15.

The disclosure provides a method of flexibly connecting several LFs by using a constant brightness of light in the LF theory. The LF may be connected by selecting a point from the connectable range and not a fixed point such as the physical cross point. The number of connecting-points may be increased rather than increasing the amount of shared light which may vary according to the camera FOV. As a result, the flexibly connectable LF system may expand the view search range under the reasonable camera FOV condition.

According to an embodiment of the disclosure, first a configuration of flexibly connecting a plurality of LFs is provided without a physical cross point. Secondly, a light field unit (LFU) is provided as an example structure to verify the flexibly connectable LF system and implemented. Thirdly, an LFU of a quadrangular structure which dynamically expands the view search range by stacking several LFUs is provided.

The suggested method of constructing a virtual space based on a stackable light field may include selecting the one LFU from the multiple light field unit (LFU) structure (S1610), allocating a rendering field-of-view (FOV) for the plurality of light fields (LF) with respect to the selected one LFU (S1620), independently rendering the view with respect to each LF (S1630), and incorporating by projecting the rendered view and blending (S1640).

In step 1610, one LFU may be selected from the multiple light field-unit (LFU) structure.

In step 1620, the rendering field-of-view (FOV) for the plurality of light fields (LF) with respect to the selected one LFU may be allocated. Specifically, the plurality of LF may be connected without the physical cross point of the linear plane by selecting a portion of the shared light from a plurality of points in the linear plane and using a constant brightness of light to connect the multiple linear planes.

The length of the linear plane may be extended to the four directions, and the linear LF obtained from the expanded plane may be connected by selecting a portion of the shared light from the plurality of points in the linear plane. Through the above-described process, it may be possible to reduce the required input FOV, and the extended length of the linear plane may be extended to the maximum of the basic length of the linear plane prior to being extended to reduce distortion of the captured image.

In step 1630, the view with respect to each LF may be independently rendered, and in step 240, the rendered view may be projected, incorporated, and blended.

In the method of constructing a virtual space according to the disclosure, because the multiple light field unit (LFU) is able to freely move through the shared light, the connectable LF system may expand the range of renderable view position under a reasonable condition of the camera. Specifically, when there are 1 to N number of the multiple light field units, movement may be possible to not only the adjacent multiple light fields but also to the multiple light field units that are physically distant through the shared light which functions as a bridge.

The suggested flexibly connectable LF system may expand the range of the renderable view position under a reasonable condition of the camera FOV which uses the suggested flexible connection. The LFU may be easily stackable as a quadrangular structure. This provides the advantage of dramatically expanding the range of the view search. The suggested LFU may achieve the 3DoF+VR with not only a superior quality but also high scalability.

The apparatus described above may be implemented as a hardware component, a software component, and/or a combination of a hardware component and a software component. For example, the apparatus and component described in the embodiments may be implemented by using, for example, a processor, a controller, an arithmetic logic unit (ALU), a digital signal processor, a microcomputer, a field programmable array (FPA), a programmable logic unit (PLU), a microprocessor, or another specific apparatus capable of executing and responding to instructions, one or more generic-purpose computers or a special purpose computer. The processing device may execute an operating system (OS) and one or more software applications which is performed on the operating system. In addition, the processing apparatus may respond to the execution of a software, and access, store, manipulate, process and generate data.

For convenience of description, the processing apparatus may be described in some cases as using one, but it will be known those of ordinary skill in the related art that the processing apparatus may include a plurality of processing elements and/or a multiple types of processing element. For example, the processing apparatus may include a plurality of processors or one processor and one controller. Further, like a parallel processor, other processing configurations may also be possible.

A software may include a computer program, a code, an instruction, or a combination of one or more therefrom, and may configure the processing apparatus to operate as desired or may independently or collectively instruct the processing apparatus. The software and/or data may be interpreted by a processing apparatus or may be embodied to a machine of certain type, a component, a physical apparatus, a virtual equipment, a computer storage medium or an apparatus to provide an instruction or data to the processing apparatus. The software may be distributed on a computer system connected to a network, and stored or executed in the distributed method.

The software and data may be stored in one or more computer readable recording mediums.

As described above, although the embodiments have been described by the limited embodiments and drawings, various modifications and changes from the disclosure may be made by those of ordinary skill in the related art. For example, the described techniques may be performed in different order from the described method, and/or coupled or combined in different form from the method in which the components such as the described system, structure, apparatus, and circuitry have been described, or an appropriate result may be achieved even if replaced or substituted by another component or equivalent.

In addition, while the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. An electronic apparatus, comprising:
   a memory stored with a multiple light-field unit (LFU) structure in which a plurality of light-fields are arranged in a lattice structure; and
   a processor configured to, based on a view position within the lattice structure being determined, generate a 360-degree image based on the view position by using the multiple LFU structure,
   wherein the processor is configured to:
   select an LFU to which the view position belongs from among the multiple LFU structure;
   allocate a rendering field-of-view (FOV) in predetermined degrees based on the view position;
   generate a plurality of view images based on the plurality of light-fields comprising the selected LFU and the allocated FOV; and
   generate the 360-degree image by incorporating the generated plurality of view images.

2. The electronic apparatus of claim 1, wherein the multiple LFU comprises the plurality of light-fields arranged in the lattice structure, a shell of the lattice structure is a circular or an atypical structure.

3. The electronic apparatus of claim 2, wherein the processor is configured to,
   generate a view image by using pixel information corresponding to a rendering FOV area from among the light-field corresponding to each of the FOV.

4. The electronic apparatus of claim 1, wherein the plurality of light-fields comprise a plurality of horizontal light-fields and a plurality of vertical light-fields arranged at predetermined first distance intervals, and
   wherein a one LFU among the multiple LFU structure is a square shape with the first distance interval as a length.

5. The electronic apparatus of claim 1, wherein the processor is configured to generate a plurality of view images by using four light-field areas comprising the selected LFU and the eight light-field areas arranged adjacently to a surrounding of the plurality of light-field areas.

6. The electronic apparatus of claim 1, wherein the processor is configured to, based on a plurality of light-fields being positioned within the allocated FOV and the plurality of light-fields having a shared light information based on the view position, generate one view image by using the plurality of light-fields based on the shared light information.

7. The electronic apparatus of claim 1, wherein the processor is configured to,
   allocate the four rendering FOVs in units of 90-degree, and generate four view images by using a light-field corresponding to each of the four rendering FOVs.

8. The electronic apparatus of claim 1, wherein the processor is configured to,
   incorporate by projecting the generated plurality of view images, and
   generate the 360-degree image by blending the incorporated view image.

9. A method of constructing a virtual space, the method comprising:
   determining a view position within a multiple light-field unit structure in which a plurality of light-fields are arranged in a lattice structure;
   allocating a rendering field-of-view (FOV) in predetermined degrees based on the view position;
   generating a plurality of view images based on the plurality of light-fields arranged adjacently with the view position from among the plurality of light-fields and the allocated rendering FOV; and
   incorporating the generated plurality of view images.

10. The method of claim 9, wherein the multiple LFU comprises the plurality of light-fields arranged in the lattice structure, a shell of the lattice structure is a circular or an atypical structure.

11. The method of claim 9, wherein the plurality of light-fields comprise a plurality of horizontal light-fields and a plurality of vertical light-fields arranged at predetermined first distance intervals, and
    wherein a one multiple light-field unit (LFU) among the multiple LFU structure is a square shape with the first distance interval as a length.

12. The method of claim 11, wherein the generating the plurality of view images comprise generating a plurality of view images by using four light-field areas comprising the selected LFU and the eight light-field areas arranged adjacently to a surrounding of the plurality of light-field areas.

13. The method of claim 9, wherein the generating the plurality of view images comprise, based on a plurality of light-fields being positioned within the allocated FOV and the plurality of light-fields having a shared light information based on the view position, generating one view image by using the plurality of light-fields based on the shared light information.

14. The method of claim 9, wherein the allocating the field-of-view (FOV) comprises allocating the four rendering FOVs in units of 90-degree, and
    wherein the generating the plurality of view images comprise generating four view images by using a light-field corresponding to each of the four rendering FOVs.

15. The method of claim 9, wherein the generating the plurality of view images comprise generating a view image by using pixel information corresponding to a rendering FOV area from among the light-field corresponding to each of the FOV.

16. The method of claim 9, further comprising:
    incorporating by projecting the generated plurality of view images; and
    blending the incorporated view images.

17. A non-transitory computer readable recording medium comprising a program for executing a method of constructing a virtual space, the method comprising:
    determining a view position within a multiple light-field unit (LFU) structure in which a plurality of light-fields are arranged in a lattice structure;

allocating a rendering field-of-view (FOV) in predetermined degrees based on the view position;
generating a plurality of view images based on the plurality of light-fields arranged adjacently with the view position from among the plurality of light-fields and the allocated rendering FOV; and
incorporating the generated plurality of view images.

* * * * *